United States Patent [19]

Tomasello, Jr.

[11] Patent Number: 4,527,937
[45] Date of Patent: Jul. 9, 1985

[54] AUTOMATIC STORAGE AND DISTRIBUTION SYSTEM

[75] Inventor: Carl A. Tomasello, Jr., Morris Plains, N.J.

[73] Assignee: Orion Automation Industries, Fairfield, N.J.

[21] Appl. No.: 494,321

[22] Filed: May 13, 1983

[51] Int. Cl.³ .................................................. B65G 65/00
[52] U.S. Cl. ........................................ 414/273; 414/276; 193/35 A
[58] Field of Search .............. 414/273, 276, 277, 278, 414/285, 286; 193/35 A; 221/299, 301; 198/601, 435, 367, 607

[56] References Cited

U.S. PATENT DOCUMENTS

| | | | |
|---|---|---|---|
| 1,210,860 | 1/1917 | Sims | 414/276 X |
| 1,632,203 | 6/1927 | Threefoot et al. | 193/35 A |
| 2,591,971 | 4/1952 | Skillman | 198/601 X |
| 2,980,222 | 4/1961 | Crosby | 193/35 A |
| 3,800,963 | 4/1974 | Holland | 414/281 X |
| 3,805,974 | 4/1974 | Andersson et al. | 414/276 |
| 4,004,701 | 1/1977 | Moses | 414/276 |
| 4,136,763 | 1/1979 | Pryor et al. | 193/35 A |
| 4,184,579 | 1/1980 | Kantarian et al. | 193/35 A |
| 4,239,436 | 12/1980 | Wildenaur | 414/278 X |

FOREIGN PATENT DOCUMENTS

| | | | |
|---|---|---|---|
| 65883 | 11/1947 | Denmark | 414/276 |
| 27161 | 3/1977 | Japan | 198/447 |
| 55179 | 5/1977 | Japan | 414/276 |
| 20282 | 2/1978 | Japan | 414/273 |
| 115503 | 9/1980 | Japan | 414/276 |

Primary Examiner—Robert J. Spar
Assistant Examiner—Stuart J. Millman
Attorney, Agent, or Firm—Parkhurst & Oliff

[57] ABSTRACT

A storage and distribution system wherein the product elements are segregated into product lanes, each product lane having a particular type of product element contained therein. The output ends of the product lanes are each provided with a release mechanism which is capable of dispensing the lead product element onto at least one main conveyor, while withholding all the rest of the product elements within the product lane. The product elements dispensed onto the main conveyors are then consolidated by a merge system, and directed onto an output conveyor which transports the consolidated order to a shipping, holding, or other suitable area. The system is also provided with means whereby the controlling system can monitor the successful completion of the product element releases, and the movement of the released product elements past the merge system, to thereby continuously monitor the progress of the dispensing sequence. The replenishing system can take the form of a depalletizing station, a replenishing conveyor running between the depalletizing station and the input ends of the product lanes, and means whereby the end of the replenishing conveyor can be suitably engaged with the product lanes. The depalletizing station can be mounted on a movable vehicle, or can be stationary.

30 Claims, 17 Drawing Figures

AUTOMATIC STORAGE AND DISTRIBUTION SYSTEM

BACKGROUND OF THE INVENTION

This invention relates to an automatic system whereby product elements may be introduced to, stored in, and dispensed from a facility. More particularly, this invention is directed toward such a system which allows a large number of product elements to dispensed with a minimum of human intervention.

Previously, most storage and distribution systems have required large amounts of manual labor. When a particular order is received, instructions are given to individual laborers who must enter the storage area and select the desired product elements, transporting them to a separate area where they are consolidated for shipment. While this system is suitable for businesses which ship low volumes of product elements, it is not well suited for larger storage facilities, for example liqueur distributing warehouses, wherein large numbers of product elements must be withdrawn from the warehouse stock and consolidated in as short a time as possible.

SUMMARY OF THE INVENTION

It is accordingly an object of the present invention to provide an automated storage and distribution system wherein product elements may be automatically dispensed from the storage area in as short a time as possible.

It is also an object of the present invention to provide a storage and distribution system whereby the released product elements may be automatically consolidated into individual orders, again in as short a time as possible.

It is a further object of the present invention to provide an automatic storage and distribution system which can continuously monitor the succssful completion of the dispensing operation.

It is a still further object of the present invention to provide such a dispensing system coupled with an automated replenishing system, which is capable of replenishing the storage areas of the warehouse at an increased rate.

Briefly, these objects are satisfied by a storage and distribution system wherein the product elements are segregated into product lanes, each product lane having a particular type of product element contained therein. The output ends of the product lanes are each provided with a release mechanism which is capable of dispensing the lead product element onto at least one main conveyor, while withholding all the rest of the product elements within the product lane. The product elements dispensed onto the main conveyors are then consolidated by a merge system, and directed onto an output conveyor which transports the consolidated order to a shipping, holding, or other suitable area.

The system is also provided with means whereby the controlling system can monitor the successful completion of the product element releases, and the movement of the released product elements past the merge system, to thereby continuously monitor the progress of the dispensing sequence.

The replenishing system can take the form of a depalletizing station, a replenishing conveyor running between the depalletizing station and the input ends of the product lanes, and means whereby the end of the replenishing conveyor can be suitably engaged with the product lanes. The depalletizing station can be mounted on a movable vehicle, or can be stationary.

DETAILED DESCRIPTION OF THE PREFERRED EMBODIMENT

Reference will now be made to the accompanying figures to describe the preferred embodiment of the present invention. It should be understood that this discussion is by way of example only, and should not be considered to limit the present invention except as required by the appended claims.

The storage and distribution system of the present invention is designed to store and dispense individual product elements 10. When the system of the present invention is applied to, for example a grocery warehouse, the product elements will typically comprise cartons in which grocery products are packaged by manufacturers, although other types of product elements may also be used. These cartons are required to be shipped from the storage facility to multiple destinations arranged in delivery routes.

Figure 1:
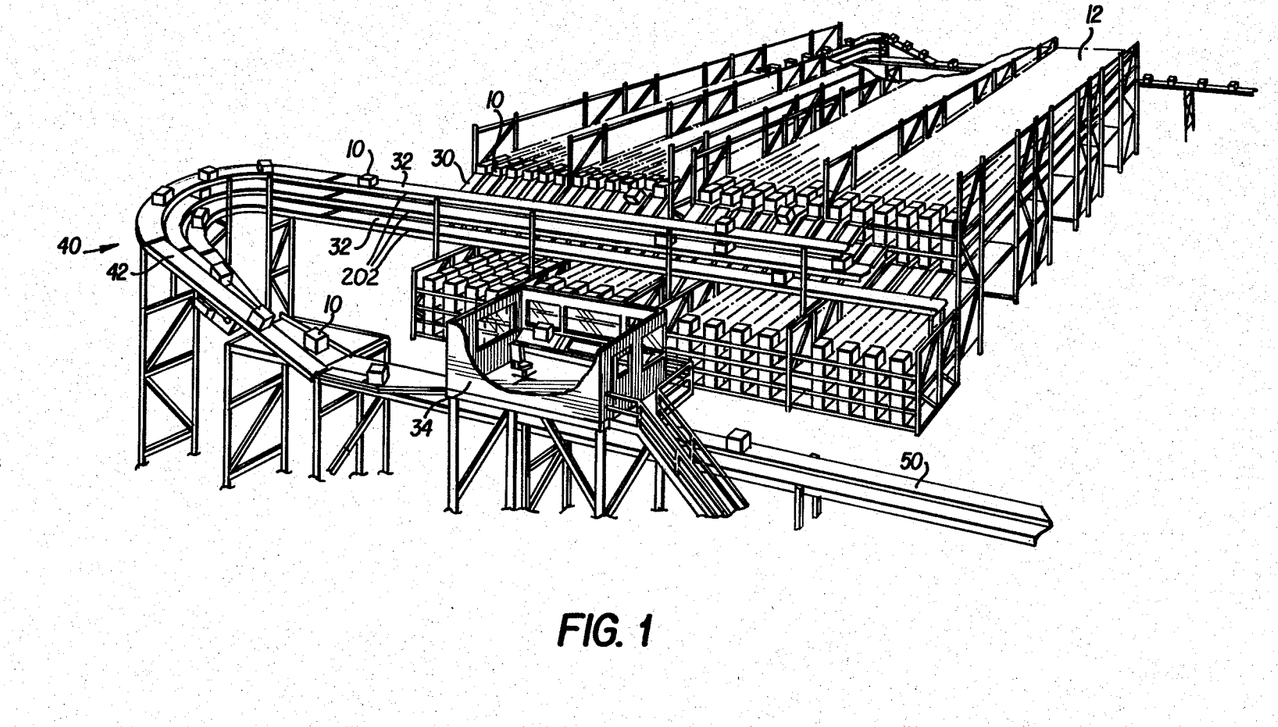
FIG. 1 is a perspective view of one embodiment of the automatic warehousing system of the present invention.

The product elements are stored in product lanes 12, which can be efficiently configured so as to extend parallel to each other in a regular array, as illustrated in FIG. 1. The product lanes 12 can conveniently be made of standard gravity feed conveyors, which can be obtained in 10 foot length sections from conveyor manufacturers. These standard lengths can then be assembled to any desired product lane length, although it is advantageous to construct the product lanes long enough to hold an excess of one entire pallet of product elements, typically a length of up to 100 feet, to thereby avoid the necessity of storing partial pallets during the replenishing phase.

As can be clearly seen from FIG. 1, the product elements are arrayed in the product lanes 12 in a single file, with the gravity feed conveyor urging the entire line of product elements 10 toward the foreground of FIG. 1.

Figure 7:
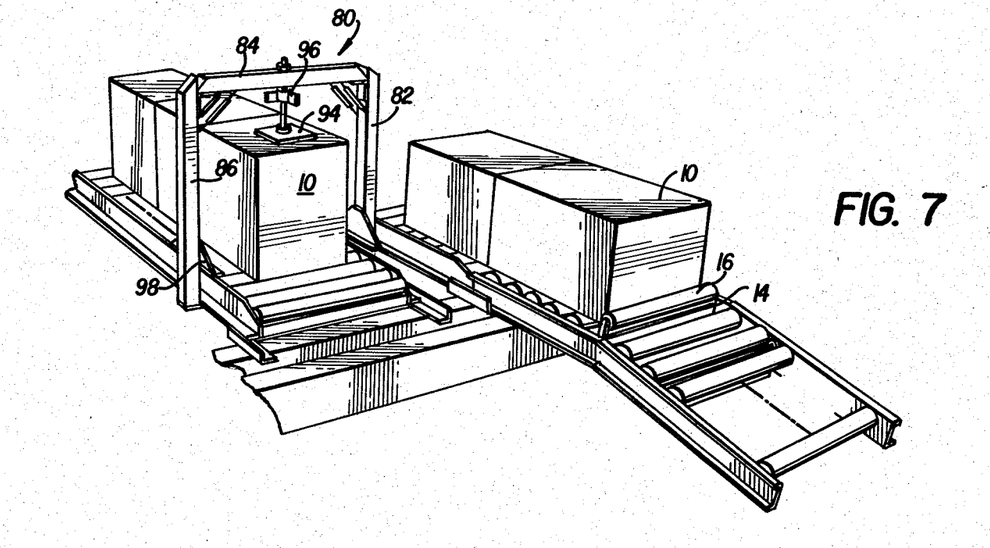
FIG. 7 is a perspective view showing the details of the release mechanism of the present invention, and showing the holding clamp used in servicing the release machanism.
Figure 11:
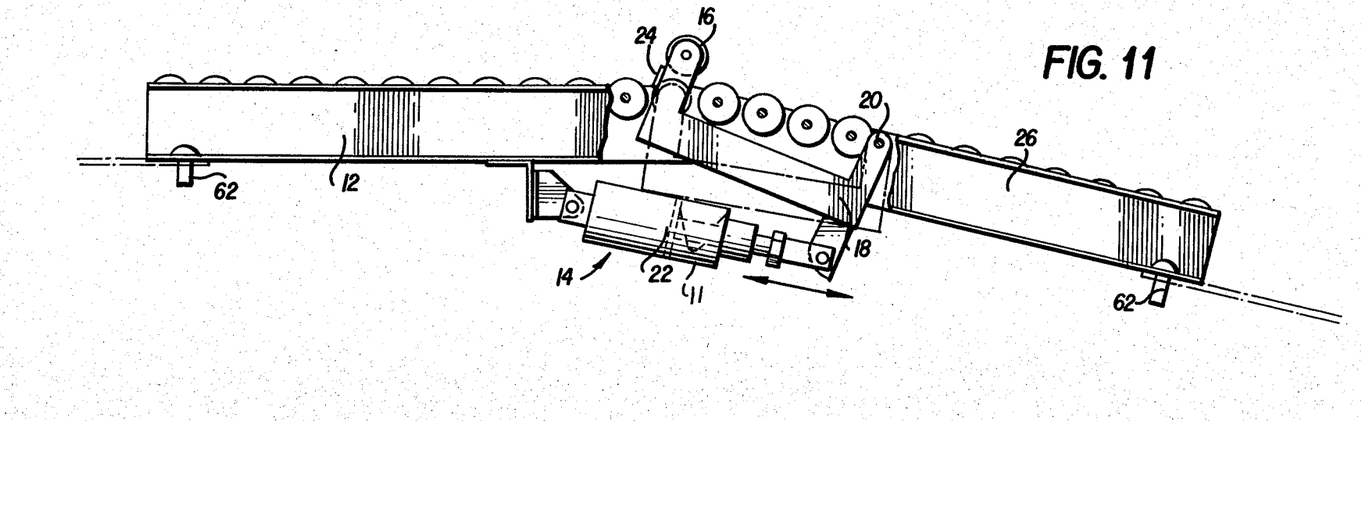
FIG. 11 is a partially cut away side view illustrating the release mechanism.
Figure 12:
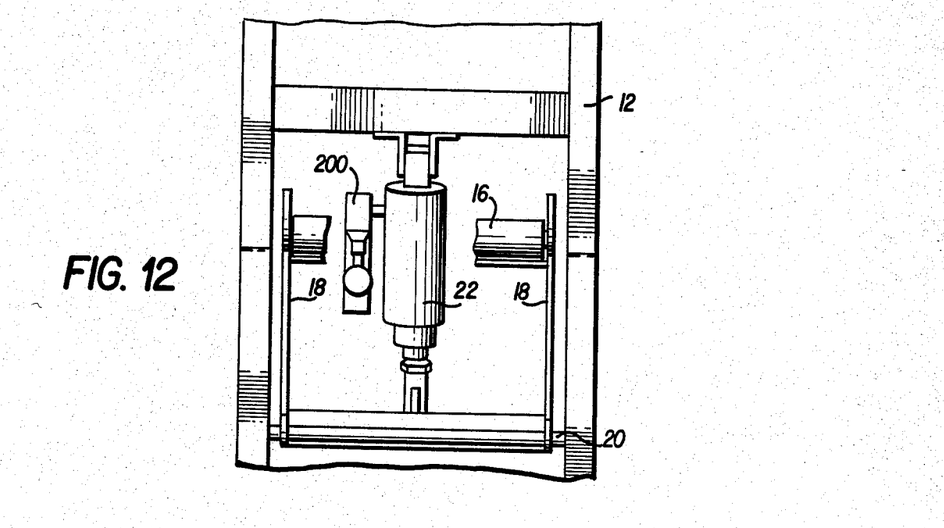
FIG. 12 is a top view of the release mechanism with the transporting rollers removed.

These output ends of each product lane 12 are supplied with release mechanisms 14, best seen in FIG. 7. The release mechanism comprises a protrusion extending into the path of the product element 10, thereby functioning to prevent the gravity urged product elements from exiting the product lane at the output end. As shown in FIGS. 7 and 11, this protrusion can advantageously take the form of a roller 16, which contacts the lower leading surface of the lead product element in each lane. This roller is secured between a pair of arms 18 which rotate about pivot 20, the pivot 20 being in turn secured to the product lane frame. The movement of the roller 16 and the product arm 18 is controlled by an actuating mechanism, as for instance compressed air powered cylinder 22. This air cylinder 22 can be of the single acting type wherein the arm and roller are positively removed to the retracted position shown by the dotted lines in FIG. 11, with the air cylinder being supplied with a spring return 11 (illustrated in phantom in FIG. 11) to urge the roller 16 into an extended position. The cylinder 22 can also be of the double acting type, should a more positive return action of roller 16 be desired.

During warm, most weather, product elements in the form of cardboard cartons become easily deformable. In that case, the lower most corner of the leading edge of the lead carton tends to deform underneath roller 16 due to the great weight of the aggregate number of cartons within the product lane 12. To prevent this occurrence, a lateral barrier 24 is provided between arms 18 beneath roller 16, to positively prevent the leading edge of the lead carton from extending beneath roller 16. The lead edge of barrier 24 is vertically aligned with the periphery of roller 16.

As can be clearly seen in FIG. 11, roller 16 separates the product elements 10 from a ramp portion 26 of the product lane 12 which has an angle of declination increased beyond that of the product lane. When a compressed air supply (not shown) is connected to the input of air cylinder 22 through the actuation of a solenoid valve 200, arms 18 are moved to the retracted position as shown in FIG. 11, thereby removing roller 16 and barrier 24 from the path of the product element 10. The gravity feed conveyor then allows the entire line of product elements to move to the right in FIG. 11, and as the lead product element encounters the ramp portion 26 it accelerates away from the other product elements.

At a predetermined time interval after the solenoid valve 200 is opened, the valve is caused to close, to thereby allow the spring return of air cylinder 22 to move roller 16 and barrier 24 into the extended position. This predetermined time interval has been selected such that the roller 16 extends as the trailing portion of the lead product element passes over it, thereby allowing roller 16 and barrier 24 to extend into the path of the next product element in line, and in turn preventing the release of more than one product element. The particular time interval used is determined experimentally for particular element lengths, frictional coefficients, total weights, etc., and will be different for different types of product elements.

As can also be clearly seen from FIG. 11, the path of roller 16 as it is retracted must necessarily extend toward the line of product elements 10 held within the product lane 12. As this occurs, the entire line of product elements 10 are caused to move backward relative to the product lane 12, thereby serving two functions. First, the gravity feed conveyor mechanism is caused to be set into motion, thereby overcoming the initial static friction associated with the product elements 10 being stationary with respect to the product lane. Second, should the portions of the gravity feed conveyor which contact the product elements cause a deformation, or "rut" to form in the bottom surface of the product elements 10, this enforced motion will be sufficient to move the product elements out of the "rut" to thereby insure a correct gravity feed.

Referring now to FIG. 1, as the released lead product element leaves the ramp portion 26, it encounters a slide 30. This slide 30 can either be a flat sheet of material or another gravity feed conveyor, as required by the individual system. It has been found that slides are more suitable for heavier articles, but gravity feed conveyors may also be used in some applications.

Running immediately adjacent the exit of each slide 30 is a main conveyor 32. When the product lanes are arranged on a single level, there will be only one main conveyor 32, which will service all of the product lane output slides 30. However, when a plurality of levels of products lanes are used, as for example the three product levels shown in FIG. 1, there will be provided a separate main conveyor 32 for each product level. These main conveyors 32 can again be any type of commercially available powered conveyor, but it has been found advantageous to provide belt conveyors in certain applications. The main conveyors 32 run such that product elements are carried from right to left as shown in FIG. 1, a product element released from the rightmost product lane in that Figure being carried sequentially past all the other product lanes in the particular product level, until finally moving past the leftmost product lane.

The operation of the storage and distribution system of the present invention is controlled through a control device 33, which is shown in FIG. 1 as housed within operator station 34. This control system can be a conventional, multi-task, interrupt driven computer system, and initially operates on data entered as a series of predetermined sets product elements to be withdrawn from the warehouse, as for example, route and stop orders in a truck delivery route.

The control device 33 operates to reorder the elements of each predetermined set into a sequence in which the product elements stored in the product lanes 12 closest to the output of the main conveyors 32 and consequently nearest counting photocells 202 are listed first. That is, the elements of the individual predetermined sets are reordered such that the product of the set stored in the leftmost product lane in FIG. 1 is first, the second leftmost product lane is ordered second, and so on.

The control device 33 then operates to actuate the release mechanisms 14 sequentially through this reordered sequence. As a result, the product elements are released from left to right in FIG. 1 simultaneously on all three levels, yet thereby preventing a newly released product element from interfering with any previously released product element already on the main conveyor 32. Since the main conveyor 32 runs from right to left, and the product elements are released in a sequence from left to right, the distance between any two product elements will increase, rather than decrease, as a result of this release sequence, thereby insuring that no interference results.

After the last product element in a particular predetermined set has been released onto the main conveyor, the computer 33 operates to withhold the release of the next predetermined set of product elements until the last product element in the preceding set has moved past the dispensing system. Photocells 202 are placed downstream of the last product lane 12 in each product level, and allow the control device 33 to count the number of product elements moving past the product lanes. When the photocells 202 reveal that all the released product elements have been moved past the product lanes, the next predetermined set is released.

Because during this time no product elements are being released onto the main conveyors 32, these conveyors may now be run at a relatively higher speed to decrease the time interval between dispensing operations. The main conveyor 32 can therefore be made to operate at variable speeds, for example at 200 feet per minute during the dispensing sequence, and at 400 feet per minute as the particular predetermined set is consolidated.

To even further increase the efficiency with which the predetermined sets are dispensed, the types of products stored in the product lanes may be arranged such that the most commonly dispensed products are stored closest to the counting photocells 202. This even further decreases the average time required to dispense a predetermined set.

Figure 3:
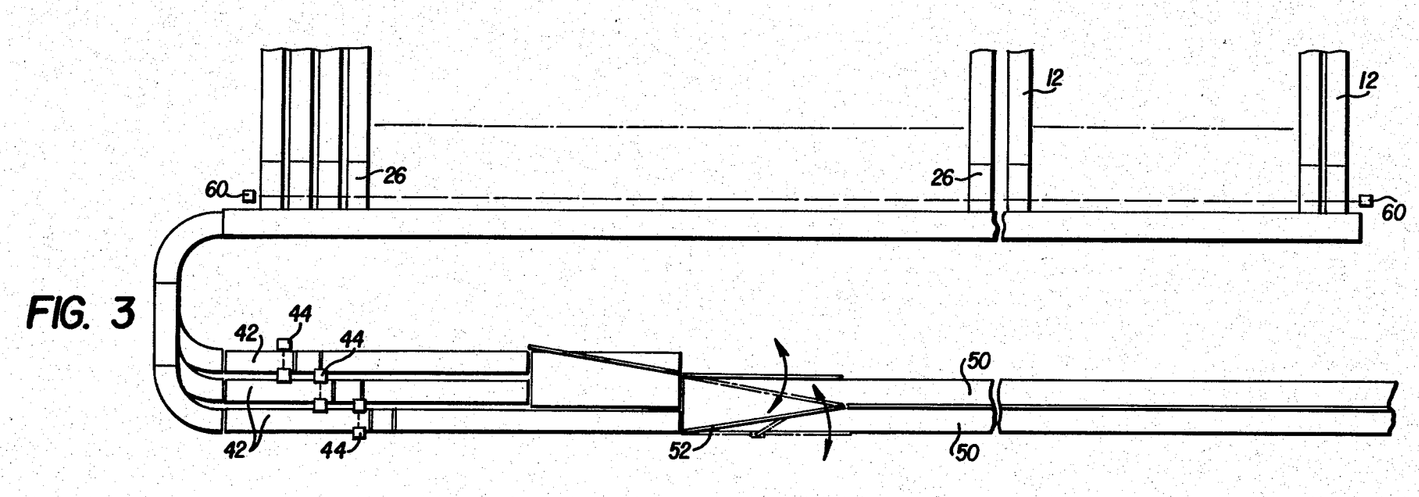
FIG. 3 is an aerial schematic view of the dispensing portion of FIG. 1.
Figure 4:
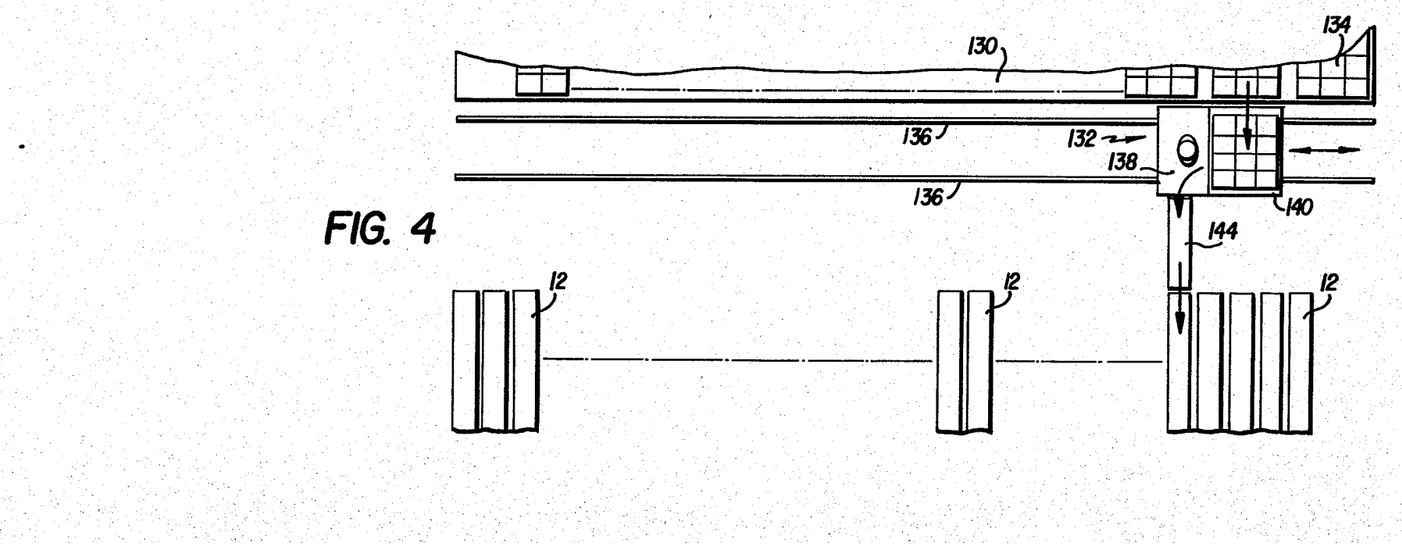
FIG. 4 is an aerial schematic view of the medium capacity replenishing system of the present invention.

When more than one product level is used, the outputs of each main conveyor 32 must be fed into a merge system 40. As seen in FIGS. 1 and 3, this merge system 40 comprises a series of laterally spaced metering belts 42, one metering belt 42 being provided for each product level used. These metering belts 42 are conventional powered conveyors, and have their input ends at the various product levels, with their outputs at a single consolidation level. At the output end of each metering belt 42 is disposed a metering electric eye 44. These metering electric eyes 44 are commercially available and are designed to sense the presence of a product element at the output end of the metering belt 42 due to the product element interrupting the light beam associated with the electric eye 44.

As the product elements from the various product levels, three levels as illustrated in FIG. 1, converge toward the merging system 40, one of the metering belts 42 will have its associated electronic eye 44 tripped before the electronic eyes of the other metering belts. The control device then senses that one metering belt is ready to begin discharging product elements onto the consolidation level before the other merging belts, and operates to continue the movement of that first metering belt, while halting the operation of all the others. When the electric eye 44 of the first metering belt 42 has sensed the passage of a number of cartons corresponding to the number dispensed at that particular product level, the other metering belts 42 having product elements 10 waiting to be discharged onto the consolidation level as detected by the associated metering electronic eyes 44 are then operated sequentially in a predetermined sequence, as for example right to left or left to right.

As can be clearly seen from FIG. 3, the metering photocells 44 of each metering belt 42 are not laterally aligned. That is, the metering photocells 44 of the metering belts 42 are staggered along the consolidation level, thereby ensuring that should two or more product elements on different metering belts arrive simultaneously at their associated photocells 44, no collision at the consolidation level will result. Thus, the product elements dispensed onto the various main conveyors 32 are now consolidated on a single consolidation level without any collision between product elements.

These product elements are now funneled, using conventional diverters, onto a single powered output conveyor 50, and conveyed to a shipping or holding area for transport. If a plurality of holding or shipping areas are to be used, there can be provided a plurality of output conveyors 50. In that case, the particular output conveyor desired is input into the control device, which then operates a movable diverting arm 52 to channel the product elements onto the correct output conveyor 50. If more than two output conveyors 50 are required, there can be provided a plurality of diverting arms 52 operating sequentially along the path of the product elements.

The automatic dispensing system of the present invention also contains provisions whereby the operation of the system can be continuously monitored. At one level these monitoring systems include the output of the metering electronic eyes 44, which not only sense the presence of product elements at the metering belt outputs for consolidation purposes, but also provide inputs to the control device for verifying that the total number of product elements released at each product level are in fact finally consolidated.

Figure 2:
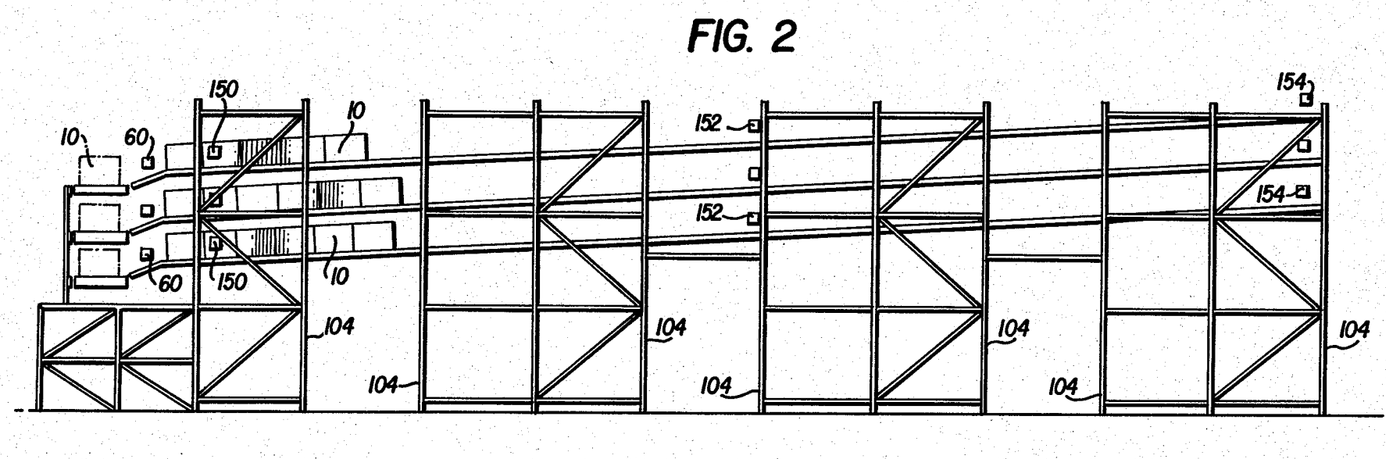
FIG. 2 is a side view of the product lanes and main conveyors of FIG. 1.

Another feature, which allows a more exact identification of any discrepancy, includes release verification electric eyes 60, best seen in FIGS. 2 and 3. These release verification electric eyes 60 extend along the entire length of a particular product level, and run over the ramp portions 26 of the product lanes. As a release mechanism 14 operates, the released product element slides down ramp portion 26, interrupts the electric eye 60, and provides an indication to the control device that an element has in fact been successfully released by the dispensing system. Since the particular product elements in each predetermined set are sequentially released, this output also identifies which product lane 12 is malfunctioning. The control device can then either shut down the entire system, institute an alarm procedure to notify an operator that correction is required, or simply make note of the discrepancy at an output terminal for a later reference by an operator, should the system be entirely automatic. Of course, other responses by the system to an indication of malfunction are possible.

In order to facilitate the replacement of a malfunctioning release mechanism 14 in the shortest possible period of time, to thereby reduce the time period during which the dispensing system is inoperative because of a malfunction, the entire section of the product lane 12 which houses the release mechanism 14 can be made removable. As is clearly shown in FIG. 11, the portion of the product lane 12 to which the release mechanism 14 is secured can be provided with protrusions 62, which mate with corresponding apertures (not shown) in the associated support structure. The entire malfunctioning release mechanism may then be disconnected from the air source and electric controls (not shown) through conventional quick release fittings on the associated air hose and power cords, and the malfunctioning release mechanism 14 can be quickly replaced by another spare unit. Since the timing of the release mechanism is controlled by the control device 33, the replacement of the release mechanism 14 does not require any calibration as to the particular type of product element being dispensed by that product lane.

Figure 8:
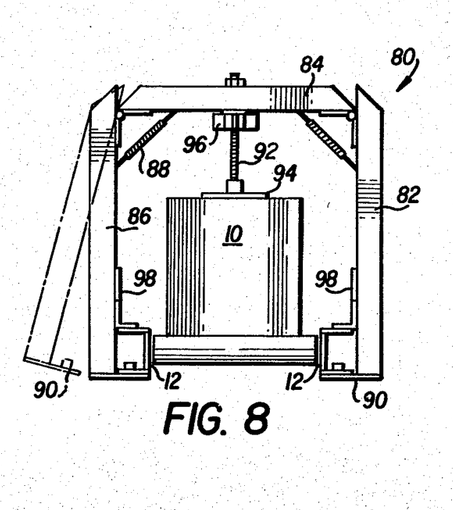
FIG. 8 illustrates the holding clamp of the present invention in greater detail than that of FIG. 7.
Figure 9:
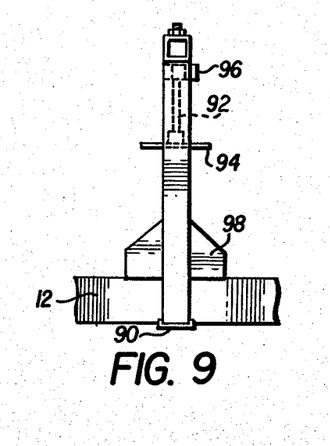
FIG. 9 is a side view of FIG. 8.
Figure 10:
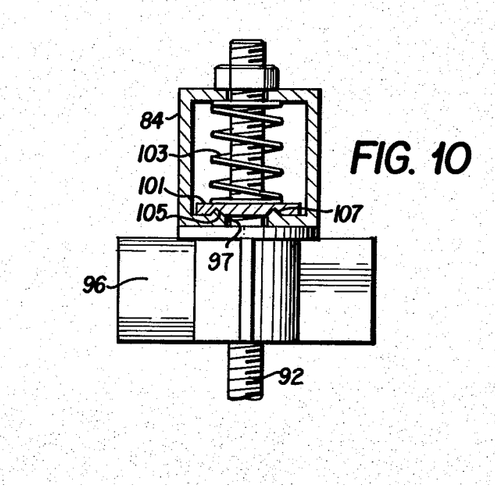
FIG. 10 is detail of FIG. 9 showing the pressure plate support structure.

In order to prevent the line of product elements 10 stored within the particular product lane 12 from moving forward when the release mechanism 14 is removed, there can be provided a holding clamp 80. This holding clamp comprises three frame members 82, 84, and 86 hinged together into a generally U-shape, the side legs 82, 86 being urged by spring members 88 toward the center line of the device, as is shown in FIG. 8. Side members 82 and 86 are each provided with flanges 90, which slip underneath the frame of the product lane 12. Screw 92 may then be operated on by star nut 96 to force pad 94 into contact with the product element 10, thereby retaining it and all the other product elements 10 behind it in place on the product lane, while the release mechanism 14 and associated lane section are replaced. Pad 94 can advantageously be provided on its lower surface with a high friction coating or rubber pad to more effectively grip the product element 10, and as can be easily seen from FIGS. 7 and 9, adjustable stabilizing flanges 98 are provided on side members 82 and 86 to engage the upper surface of the product lane frame, to thereby prevent the holding device 80 from being rotationally carried forward along the path of the product lane. Stabilizing flanges 98 can be made to be secured to side members at a plurality of positions by conventional fastening means to accomodate various product lane dimensions.

Shaft 99 at the upper end of screw 92 is threadably secured to square nut 108 through aperture 97. Nut 101 is also urged by spring 103 toward aperture 97 and ridges 105, which mate with grooves 107 in nut 101. This allows shaft 99 to move relative to member 84 to a limited degree, to thereby prevent wear and tear on shaft 99.

As can be seen in FIG. 2, each of the product lanes slants downward toward the associated main conveyor 32, as is consistent with the gravity feed function. It has been found that the effectiveness of the gravity feed function in combination with the release mechanism 14 is dependent upon the pitch, or angle of declination, of the product lane 12. This pitch can be easily adjusted by using the hydraulic jack system illustrated in FIG. 13. In that device, jack 100 is used to selectively engage cross member 102, upon which the product lane conveyor sections are secured. In theory it is possible to provide a separate cross member 102 for each end of each 10 foot gravity feed conveyor section used to construct the product lanes 12. However, as a practical matter it has been found that the cross member 102 can support adjacent sets of three or six product lanes 12 without any difficulty.

Figure 13:
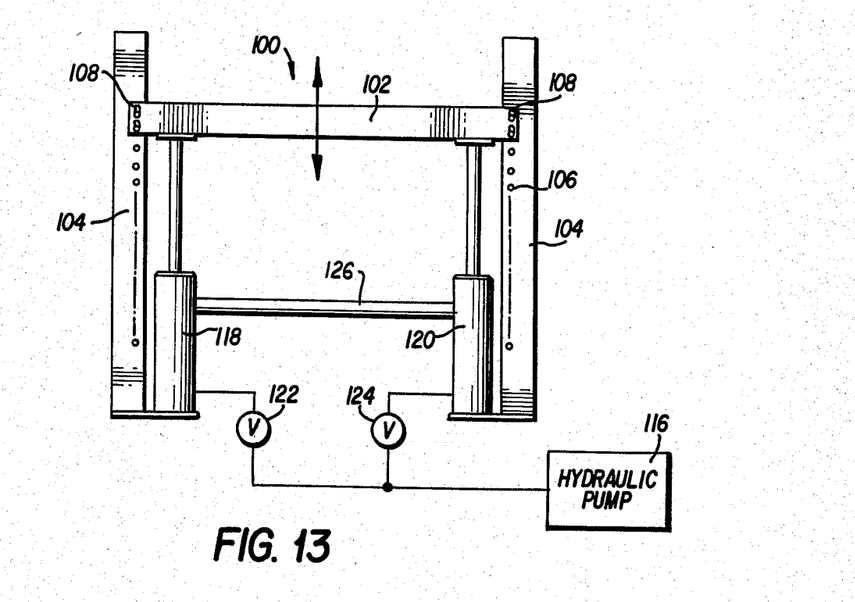
FIG. 13 illustrates the hydraulic jack used to adjust the pitch level of the product lanes of the present invention.
Figure 14:
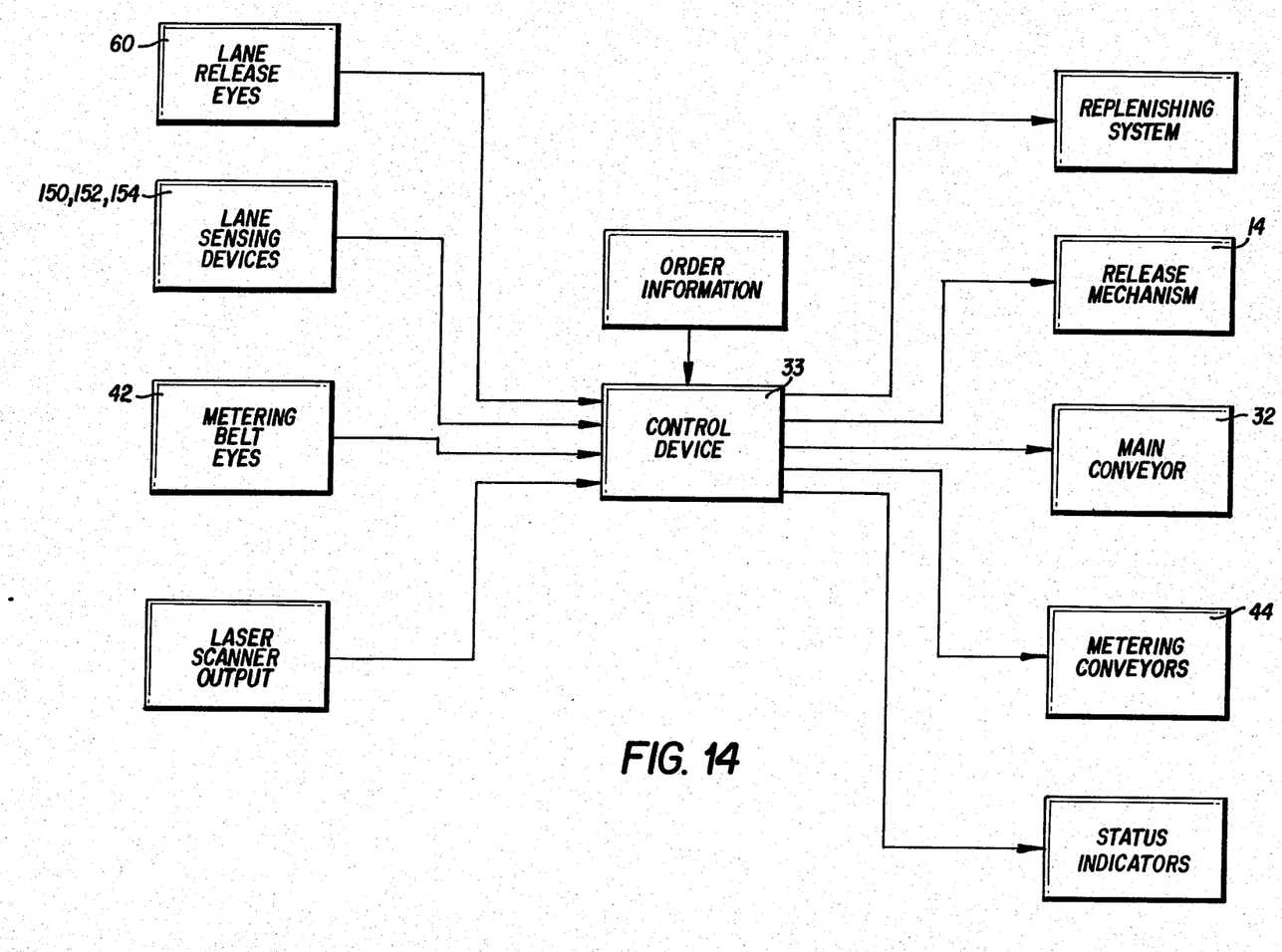
FIG. 14 is a block diagram describing the interaction of the various components of the present invention.
Figure 15:
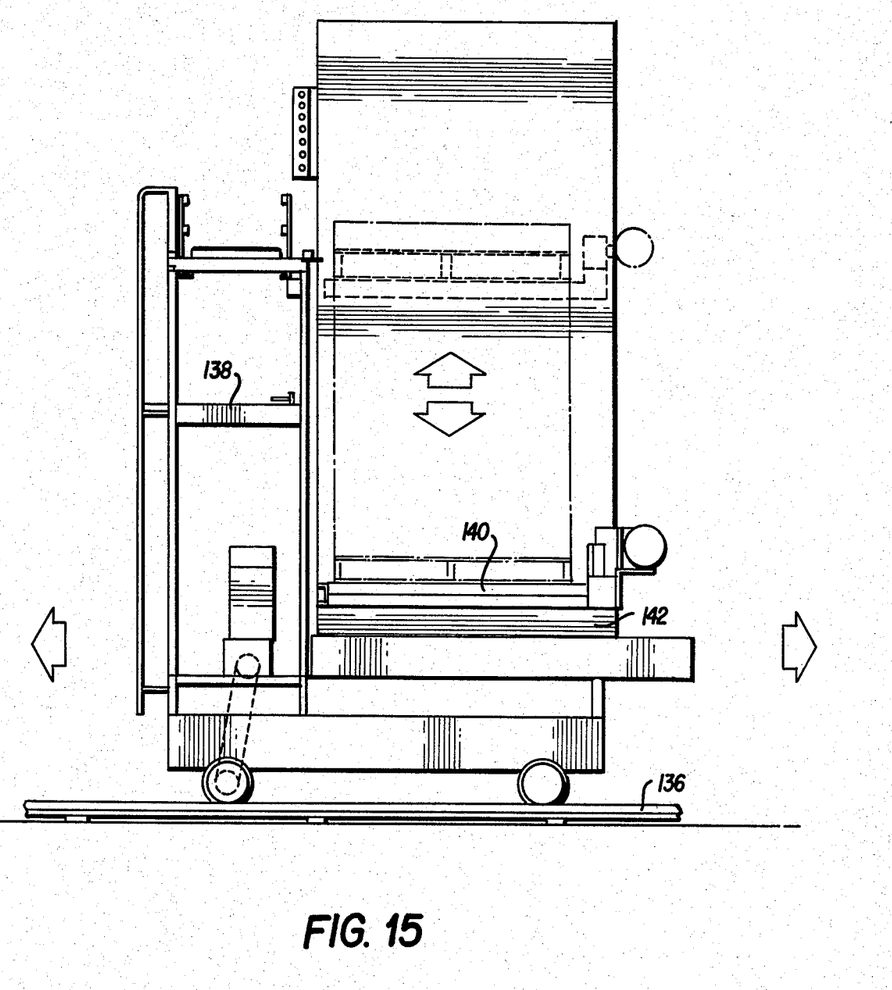
FIGS. 15 and 16 are front, top and side views, respectively, of the medium capacity replenishing vehicle of the present invention.
Figure 16:
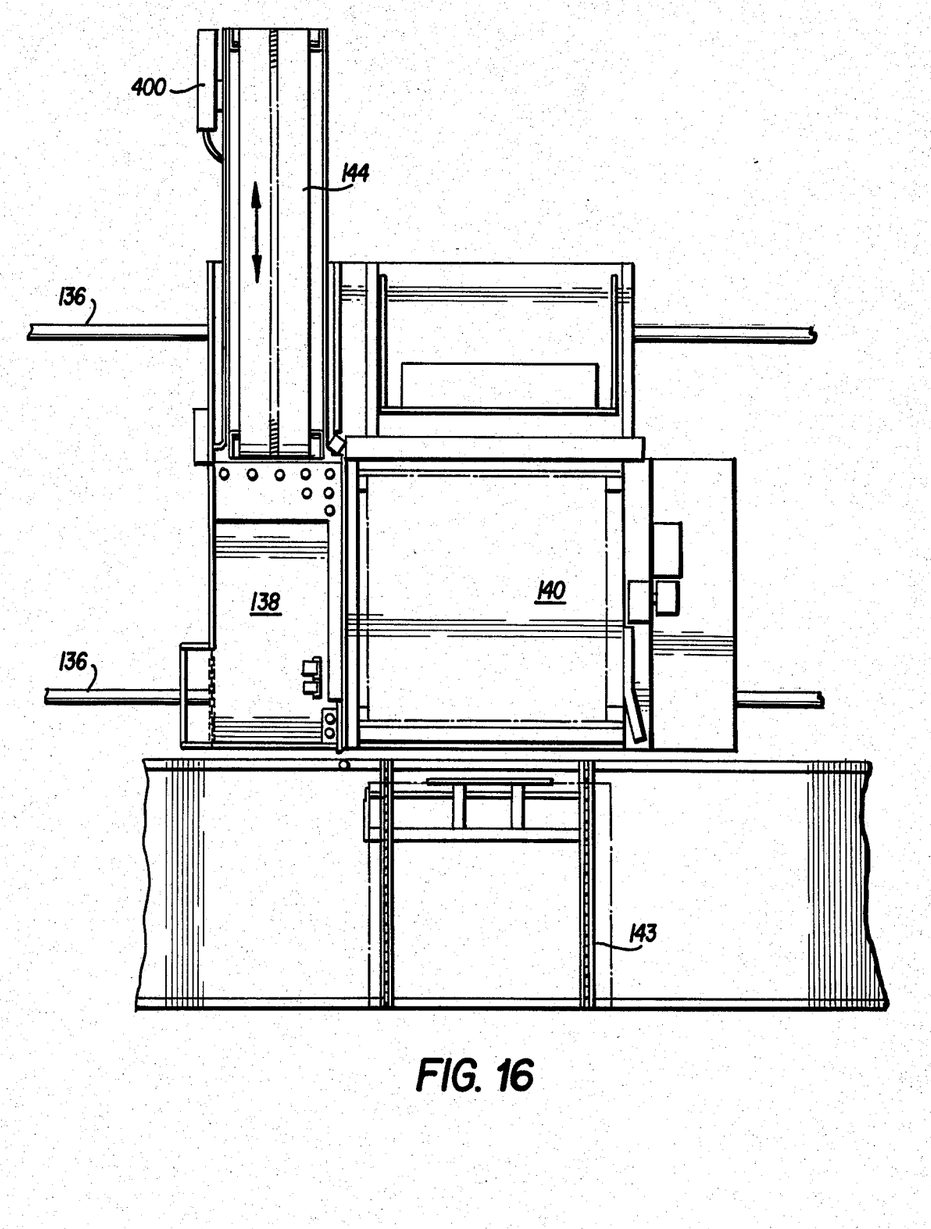

Upstanding posts 104 can be provided with a plurality of apertures along their length, for example at one inch distances therealong. These apertures 106 are capable of being aligned with slots 108 in cross member 102, such that a carriage bolt or other suitable securing means may run through both upstanding post 104 and cross member 102 to rigidly secure both elements together.

The jack 100 of the present invention comprises a hydraulic pump 116 which feeds a pair of hydraulic cylinder-type jacks 118 and 120. The flow of hydraulic fluid through these cylinder jacks is controlled by valves 122 and 124. Cylinder jacks 118 and 120 are also rigidly interconnected by spacing bar 126.

In use, the jack is placed underneath the cross bar 102 whose position is desired to be adjusted, as shown in FIG. 13. The hydraulic pump is then operated to move both hydraulic jacks 118 and 120 into contact with cross bar 102 until the load on the carriage bolts is relieved. The carriage bolts are then loosened, and the hydraulic pump is manipulated such that the jacks either raise or lower cross member 102, as desired. If the adjustment is within the dimensions permitted by slots 108, the carriage bolts need not be removed from post 104. Upon achieving the desired pitch of the gravity feed conveyor section, the carriage bolts are then reinstalled and tightened, and the hydraulic pump 116 is operated to retract each of the cylinder jacks 118 and 120. Valves 122 and 124 are provided so that if one cylinder jack 118 or 120 achieves the correct level before the other, the correctly positioned cylinder jack can be isolated from the hydraulic pump, and the other remaining cylinder jack can be "fine tuned" to the correct level.

The dispensing system of the present invention can be advantageously coupled with a system for replenishing the product lanes 12 as the supply of product elements therein decreases. At the simplest level, this replenishing can take the form of a low capacity, purely manual system, in which pallets containing product elements of a single type are brought in close proximity to the inputs ends of the product lanes, and the product elements are transferred manually thereinto.

FIGS. 4 and 15–17 illustrate a medium capacity replenishing system wherein product elements can be depalletized and automatically transferred into the particular product lanes. This system generally comprises a pallet storage area 130, and a movable vehicle 132 which depalletizes the product elements. As can be clearly seen from FIG. 4, the pallet storage area 130 runs generally parallel to, but spaced apart from the input ends of the product lanes 12. The pallet storage area 130 holds pallets 134 of product elements in a regular array, and can be loaded, for instance by a forklift from the side of the pallet storage area 130 opposite the product lanes 12.

The vehicle 132 runs between the product lanes 12 and the pallet storage area 130 along rails 136. The vehicle 132 itself comprises a stationary operator platform 138, and a powered conveyor 140, which is elevatable by lift device 142. During operation, the vehicle is moved along rails 136 until the powered conveyor 140 is aligned in the direction of vehicle travel with the particular pallet desired. At this time the lift device 142 is manipulated to bring the powered conveyor 140 up to the level of the pallet desired. As shown clearly in FIG. 17, the pallet is stored on an inclined gravity feed conveyor 143, which has any suitable release mechanism 301 at its discharge end to selectively release the stored pallet. When this release mechanism is actuated, the pallet slides forward until the leading edge thereof rests on powered conveyor 140, whereupon the pallet is drawn onto vehicle 132. The lift device 142 is now adjusted until the top level of the pallet is even with the input level of stocking conveyor 144.

Figure 17:
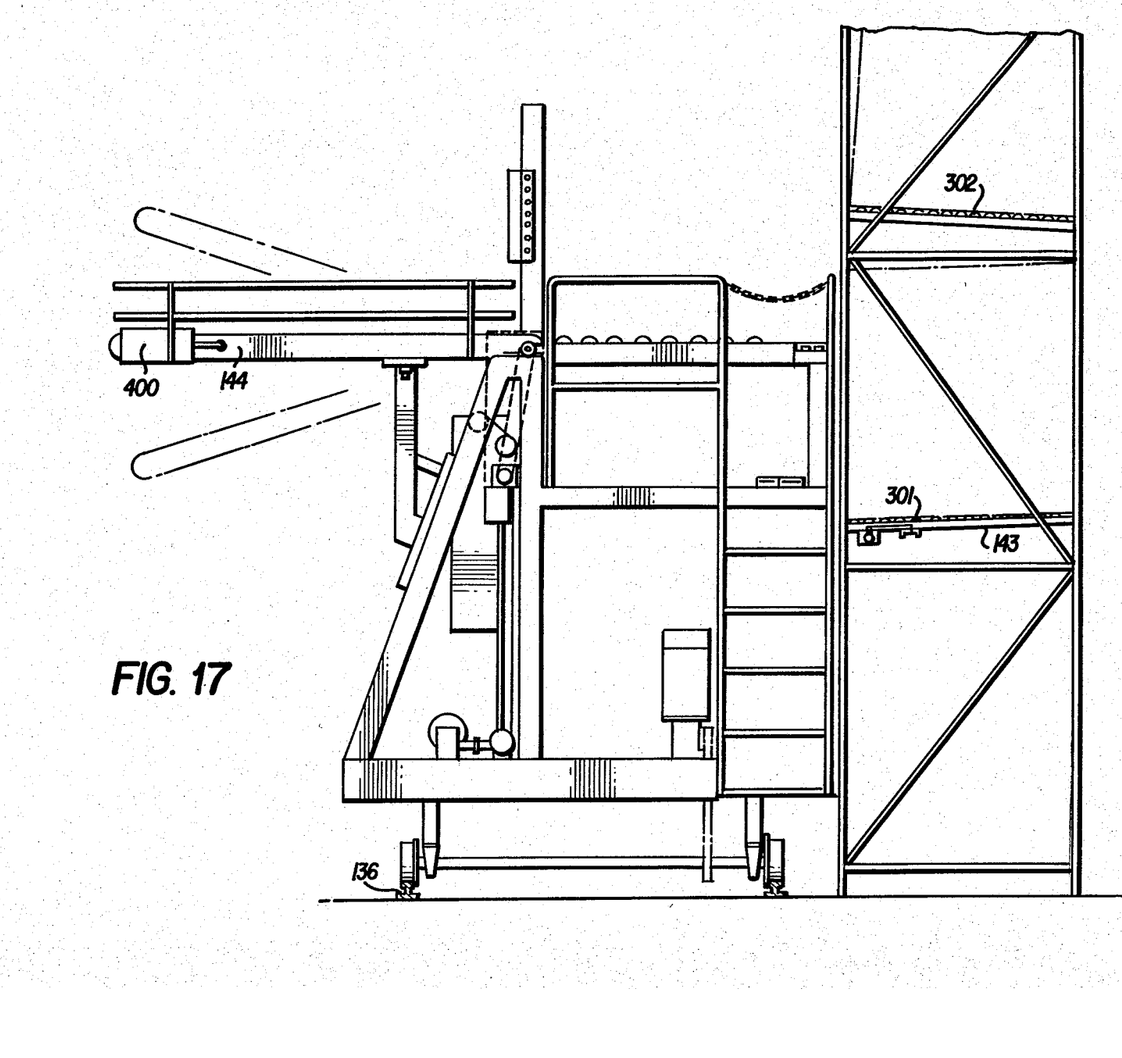

As shown in FIG. 17, the pallet storage area 130 may be provided with a pallet return conveyor 302, upon which the powered conveyor 140 may discharge partially depalletized pallets for return and storage.

Stocking conveyor 144 is a powered conveyor supported by vehicle 132. The input end of stocking conveyor 144 is closest to the vehicle, and is secured thereto such that stocking conveyor 144 pivots therearound. Any suitable linkage and control mechanism can be provided to adjust the level of the output end of stocking conveyor 144 to the input ends of the product lanes 12 of each product level.

The vehicle 132 is now moved along rails 136 until the output end of stocking conveyor 144 is aligned in the direction of vehicle travel with the input end of the particular product lane 12 desired to be restocked. The angle of the stocking conveyor 144 is then adjusted to bring the output end thereof into close proximity with the input of the product lane 12. The top layer of product elements of the pallet are transferred sequentially onto the stocking conveyor 144 and are thereby transferred into the product lane, whereupon the gravity feed conveyor forming the product lane 12 serves to transport the product element into contact with the remaining stock. The lift device 142 can now be adjusted to bring the next layer of the pallet up to the same level as the input end of stocking conveyor 144, and the process repeated until the lane is full or the pallet is emptied. The vehicle 132 may now be moved along rails 136 until the powered conveyor 140 is in alignment with the next desired pallet, and the entire process repeated.

Sensing devices, which may be trip sensors, etc. are positioned across each product lane, sensing device 150 indicating that the lane is empty, sensing 152 indicating that the lanes are less than half full, and sensing 154 indicating that the lane is entirely full. The output of these sensing devices 150, 152 and 154 can be combined with the control device 33 to display the stock conditions of the various product lanes 12.

The high capacity automatic replenishing system of the present invention involves the use of a stationary depalletizing station, rather than the movable station associated with the vehicle 132 of the medium capacity system. This stationary depalletizing station is coupled with a replenishing conveyor which runs from the depalletizing station to the input ends of the various product lanes 12, and is further combined with a stocking mechanism for transferring the product elements from the replenishing conveyor actually into the product lanes.

Figure 5:
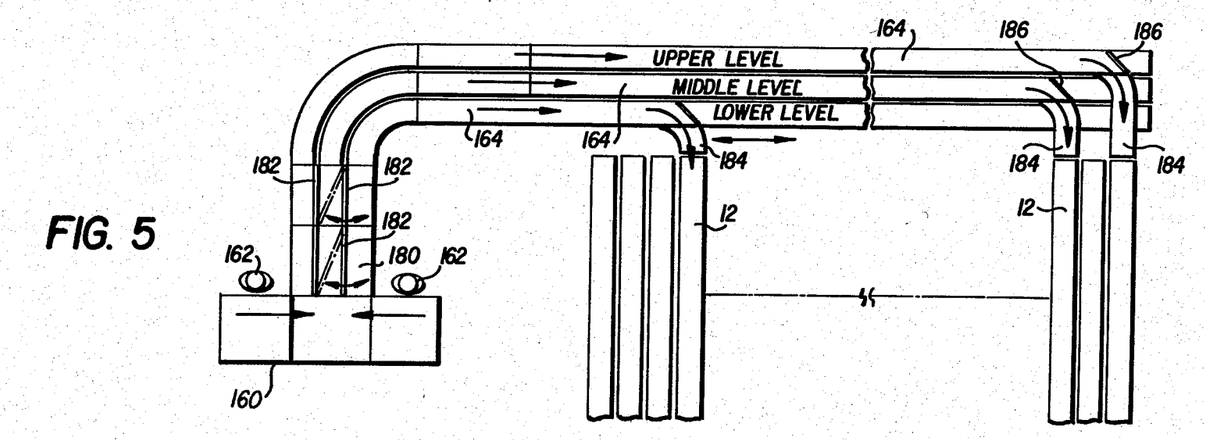
FIGS. 5 and 6 are aerial schematic views of alternate embodiments of the high capacity replenishing system of the present invention.
Figure 6:
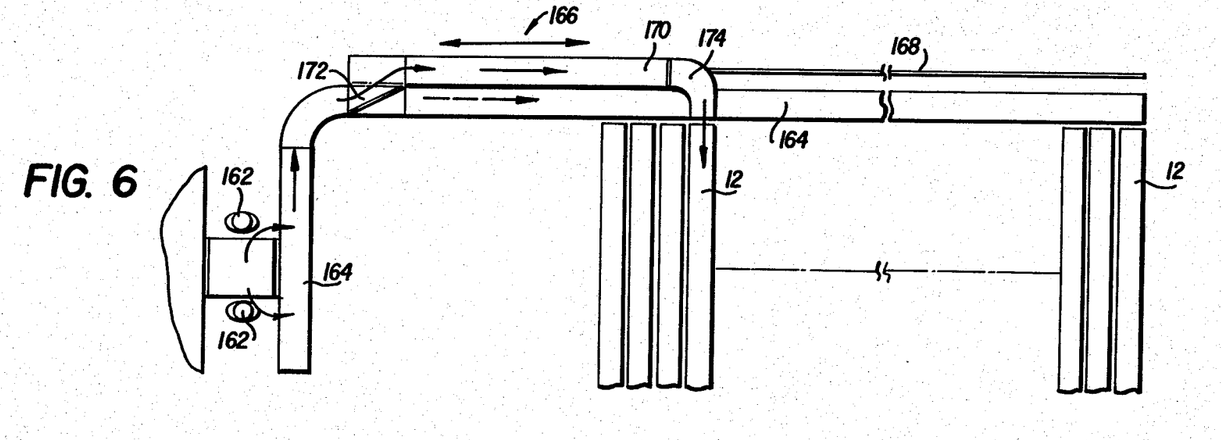

This high capacity system can take either of two forms, as illustrated in FIGS. 5 and 6. As shown in FIG. 5, the depalletizing station 160 is a two man station, at which two operators 162 operate a lift device similar to lift 142 to remove a single type of product element from a single pallet onto replenishing conveyor 164. This replenishing conveyor 164 is comprised of standard power driven conveyor elements, and extends along the input ends of product lanes 12, multiple levels of product lanes having been shown as superimposed for the purposes of FIG. 5. Coupled with this replenishing conveyor is a stocking conveying system 166, which runs along rail 168 or other suitable drive means in close proximity to replenishing conveyor 164.

Input ends of product lanes 12 are identified by means of a bar code which details the particular type of product stored therein. The stocking conveying system is provided with a laser scanner, and is supplied with a signal from control device 33 identifying the product to be replenished. Stocking system 166 then moves down the path of travel until a bar code identifying the proper product is sensed, at which point the discharge end of system 166 is aligned with the proper product lane.

The stocking conveying system 166 illustrated in FIG. 6 includes transferring conveyor 170, diverting unit 172 and a set of stocking turns 174, all the elements of the stocking conveying system moving together as a unit. The diverting unit 172 has a diverting arm fixed above the surface of replenishing conveyor 164, such that product elements being transported by the replenishing conveyor and contacting the diverting arm will be diverted onto transferring conveyor 170. Stocking turns 174 are shown as superimposed in FIG. 5 in a manner similar to the product lane 12, and are of the same number as the number of different product levels used in the dispensing system. These turns 174 can be commercialy available conveying turns, and are disposed in a tiered relationship such that the output of each stocking turn 174 is at the same level as the input of the product lanes 12 of the associated product level. Transferring conveyor 170 is a commercially available variable incline conveyor, and can be operated such that the output aligns alternatively with the inputs of all the stocking turns 174 used in the tiered array, the number being three in this illustration.

When a particular product type is being depalletized at depalletizing station 160, this information is fed into the control device, which in turn causes the stocking conveying system 166 to move along rails 168 in response to the bar code labels until the tier of stocking turns 174 is aligned with the product lane 12 holding that particular product type. The transferring conveyor 170 is then tilted until the output thereof aligns with the input of the stocking turn 174 whose output is aligned with the desired product lane 12. The product elements depalletized at station 160 are carried by replenishing conveyor 164 until they contact the diverting arm of diverting unit 172, whereupon they are transferred to transferring conveyor 170, to stocking turn 174, and then enter the associated product lane 12.

The embodiment of the alternate high capacity replenishing system illustrated in FIG. 6 utilizes two operators 162 to simultaneously depalletize two different types of product elements. These depalletized product elements are transferred onto powered conveyor 180, which carries the product elements toward a series of movable diverting arms 182. These diverting arms 182 channel the product elements alternatively onto one of a plurality of replenising conveyors 164, whose number is the same as the number of product levels used in the dispensing system, in a manner similar to that associated with stocking turns 174. Replenishing conveyors 164 are shown in FIG. 6 as laterally spaced near the inputs of product lanes 12, but can as easily be superimposed thereat should space requirements so dictate.

Diverting arms 182 are of a type conventionally known in the conveying art, and are disposed in a cascading series, such that the product element encounters a plurality of diverters in being moved from one lateral edge of powered conveyor 180 to the other lateral edge. Of course, should the number of replenishing conveyors desired be greater than the three illustrated in FIG. 6, a larger number of diverting units 182 would be required.

Moving along each of the replenishing conveyors 164 of FIG. 6 in response to bar code labels a manner similar to stocking system 166 along conveyor 164 of FIG. 5 is an associated stocking turn 184, with each stocking turn 184 being capable of moving such that its output is capable of being aligned with the input of every product lane 12 in the associated product level. Also associated with the stocking turns are stationary diverting arms 186, which are rigidly mounted to the frame of each stocking turn 184. These diverting arms 186 move in unison with the associated stocking turns 184, and extend over conveyors 164 so as to cause the product elements on the replenishing conveyor 164 to be diverted onto the powered stocking turn 184, and subsequently into the associated product lane 12.

What is claimed is:

1. A release mechanism for releasing the lead carton in a series of cartons which are urged by urging means in one direction along a product lane, the release mechanism comprising: a roller extending above the surface of the lane at an extended position such that the leading edge of the lead carton contacts and is stopped by the roller, the roller being supported on a support arm pivotable about an axis downstream of the roller, the speed at which the urging means transports the carton along the product lane increasing just downstream of the roller, the roller being resiliently urged to the extended position, retracting means for retracting the roller to a position beneath the lane, to allow the cartons to move toward and past the release mechanism, said retracting means being connected to said support arm such that activation of said retraction means pivots said support arm to move the roller against the leading edge of the lead carton and urge the series of cartons in a direction opposite to said one direction, the roller being returned to the extended position when the trailing edge of the lead carton moves over the roller, to thereby allow the roller to extend into the path of the second carton and prevent the second carton from being released.

2. The release mechanism of claim 1 in combination with a dispensing system for repeatedly dispensing various predetermined sets of different types of products, the dispensing system comprising:
   a plurality of product lanes, each product lane containing a series of product elements of a single type and having an output at which said elements exit the product lanes, and an input;
   one release mechanism associated with each product lane;
   a main conveyor running along the outputs of the product lanes, the product lanes arranged such that the main conveyor travels along all the lane outputs sequentially from an upstream to a downstream product lane;
   sensing means for sensing and counting product elements, said sensing means being located at spaced intervals along said main conveyor and said product lanes;
   a control device which reorders the elements of a predetermined set of product elements into an order ascending along the path of the conveyor, and actuates the release mechanisms of the product lanes holding those elements in ascending order, said control device reordering product elements and actuating release mechanisms in response to an input of desired product elements and in response to the sensing and counting of said product elements by said sensing means.

3. A dispensing system as in claim 2, wherein the control device causes the release mechanisms to avoid releasing the next set of elements until after the last element in the preceeding set has been carried past the downstreammost product lane by the conveyor, the main conveyor is a two speed conveyor, and means are provided for causing the main conveyor to operate at a high speed from when the last product element is released onto the main conveyor until the element passes the downstreammost product lane.

4. A dispensing system as in claim 2, wherein at least one output electric eye is provided to detect each product element emerging from the product lanes and thereby entering the main conveyor, and wherein the control device utilizes the output of the at least one output electric eye to sense whether each released product element has in fact left the associated product lane.

5. A dispensing system as in claim 2, wherein a plurality of main conveyors are used, each main conveyor being fed by a separate plurality of product lanes, and wherein a merge system is provided to consolidate the product elements carried by each main conveyor into a single output conveyor, the merge system comprising a metering belt for each main conveyor, each metering belt accepting the output of the associated main conveyor and leading to an output conveyor, metering electric eyes associated with each metering belt, the metering eyes sensing when a product element reaches each metering belt, wherein the control device further controls the metering belts to cause the metering belt having its metering eye tripped first to continue operating and thereby discharge all the product elements carried by the associated first main conveyor onto the output conveyor, while stopping all the other metering belts from discharging the product elements held by the other main conveyors until the first main conveyor is emptied.

6. A dispensing system as in claim 5, wherein the positions of the metering eyes of the metering belts along the output conveyor are staggered.

7. A dispensing system as in claim 5, wherein the metering eyes further sense the passage of each successive product element past the metering belt, thereby allowing the control device to count the number of product elements discharged by each main conveyor as a confirmation that the predetermined set has been correctly discharged.

8. A dispensing system as in claim 5, wherein a plurality of merge systems used, with the outputs of each merge system being subsequently further merged into a single output.

9. A dispensing system as in claim 2, wherein the product types most frequently appearing in the predetermined sets are dispensed by the product lanes furthest down the sequential path of the main conveyor.

10. A dispensing system as in claim 2, combined with a mechanism for replenishing the supply of product elements in each product lane, each product lane having said sensing means located at spaced intervals along said product lane for determining the number of product elements in each product lane, the replenishing mechanism comprising pallet storage racks for storing pallets of product elements, and a vehicle movable along the inputs of the product lanes and the pallet storage racks, the vehicle having a stationary operator platform and a reusable product platform capable of attaining the level of the stored pallets, the product platform having a powered conveyor thereon to draw the pallet from the pallet storage rack, the vehicle further having a stocking conveyor secured thereto with an input end stationary with respect to the operator platform, but an output end movable to all the levels of the lane inputs, such that the pallet may be drawn from the storage rack, and adjusted with respect to the operator platform, and the product elements may be transferred horizontally to the conveyor input and then conveyed to the respective product lanes, said control device activating said replenishing mechanism in response to said sensing means when the number of product elements in a particular product lane is determined to be less than a predetermined number.

11. A dispensing system as in claim 2, combined with a product lane replenishing system having a stationary depalletizing station, a replenishing conveyor having an input adjacent to the depalletizing station and an output, and a stocking conveying system adjacent the output of the replenishing conveyor, each product lane having said sensing means located at spaced intervals along said product lane for determining the number of product elements in each product lane, said control device activating said replenishing system in response to said sensing means when the number of product elements in a particular product lane is determined to be less than a predetermined number.

12. A dispensing system as in claim 11, wherein the replenishing conveyor runs along the inputs of all the product lanes, and the stocking conveying system comprises a diverter for diverting the product elements off the replenishing conveyor, a set of stocking turns for diverting the product elements into a particular product lane, one stocking turn being provided for each level at which the lane inputs are disposed, and a transferring conveyor running between the diverter and the stocking turns, the transferring conveyor capable of feeding each of the stocking turns alternatively from the diverter, the diverter, transferring conveyor and stocking turns being provided with means for moving them along the path of the replenishing conveyor as a unit such that the stocking turns are able to mate with the inputs of each product lane.

13. A dispensing system as in claim 11, wherein the inputs of the product lanes are at a plurality of different levels, there are a plurality of replenishing conveyors running between the depalletizing station and the stocking conveying system corresponding to the number input levels, each replenishing conveyor running along the lane inputs of the associated level, and the stocking system comprises a plurality of stocking turns corresponding to the number of input levels, the stocking turns being configured so as to divert product elements from the associated replenishing conveyors into input lanes of the associated level, means being provided to allow the stocking turns to move independently to all the lane input of each associated level of lane inputs, such that product elements of a single type directed onto a particular replenishing conveyor at the depalletizing station can be directed into the associated product lane.

14. A release mechanism as in claim 1, wherein the time period that the roller is retracted can be adjusted to accommodate different carton lengths and speeds over the lane.

15. A release mechanism as in claim 1, wherein the roller is constrained to move in a path toward the line of cartons as it is retracted, to thereby set the cartons in motion prior to the cartons being released.

16. A release mechanism as in claim 1, wherein the release mechanism is provided with a lateral barrier in the path of the carton beneath the roller to prevent the lead edge of the lead carton from deforming underneath the roller.

17. A release mechanism as in claim 16, wherein the edge of the lateral barrier closest to the cartons is vertically aligned with the roller.

18. A release mechanism as in claim 14, wherein the retracting means is a compressed air powered cylinder, and the adjusting means comprises a variable time length signal controlling the supply of compressed air to the cylinder.

19. The release mechanism of claim 1, in combination with a hold back clamp for securing the cartons within the product lanes without the need of the release mechanism, the hold back clamp comprising a top member having two ends, side members pivotably secured to each end of the top member such that the side members in combination with the top member are capable of assuming a U-shaped configuration; the side members being long enough to reach the product lane while the top member is above the product elements; the side members further provided with means for releasably securing the side members to the product lane; a screw clamp positioned through said top member and extending toward the product elements, the screw clamp capable of being extended toward the top of the product element to thereby engage the product element and prevent the product element from moving along the product lane.

20. A combination release mechanism and hold back clamp as in claim 19, wherein means are provided on each of the side members for preventing the side members from rotating with respect to the product lane in the direction in which the cartons travel therealong.

21. A combination release mechanism and hold back clamp as in claim 20, wherein means are provided for allowing the screw clamp to pivot with respect to the top member the direction in which cartons travel along the product lanes.

22. A release mechanism for controlling the release of cartons held in a single file on a gravity feed conveyor, the release mechanism comprising:
a main pivot secured to the conveyor at a position beneath the plane in which the cartons are stored, the main pivot running laterally across the conveyor;
a pair of support arms pivotably secured to said main pivot and having ends opposite the pivot which extend above the plane at which the cartons are stored, the ends of the support arms facing in a direction opposite to the direction in which the cartons are gravitationally urged;
a compressed air cylinder pivotably connected at one end to the conveyor, and pivotably secured at the other end to the support arms at a position spaced away from the main pivot;
a roller pivotably secured between the support arms at the ends of the arms opposite the main pivot, whereby the roller extends into the path of cartons on the conveyor to stop the movement of the cartons therealong;
whereby the actuation of the cylinder causes the support arms to swing downward such that the roller is moved out of the path of the cartons and the cartons are thereby released, and the roller as it moves downward is constrained to move toward the cartons to set the cartons in motion prior to their release.

23. A release mechanism as in claim 22, wherein the gravity feed conveyor slopes downward at an increased rate just beyond the roller, whereby the lead carton is caused to accelerate away from the other cartons as it is released.

24. A release mechanism as in claim 22, wherein the time duration of the supply of compressed air to the cylinder is variable, and wherein when the supply is stopped the roller resiliently returns to the extended position, to thereby accommodate different box configurations.

25. A release mechanism for releasing one product element at a time from a series of elements stored in a single file in a product lane, the product elements being urged in a common direction along the product lane, the release mechanism comprising: a protrusion releaseably and returnably held in the path of the product elements along the product lane; means to retract the protrusion from said path for a predetermined amount of time, thereby allowing the lead element to move past the protrusion, activation of said means to retract moving the protrusion against the product elements in a direction opposite to said common direction; and means to return the protrusion into the path of said elements; the time period during which the protrusion is removed being adjustable so that, when different product element types are used, the period may be selected such that only one element is allowed to move past the protrusion during each removal cycle.

26. The release mechanism of claim 25, wherein when the protrusion is removed it causes the elements in the series to move backward in the product lane prior to being released.

27. The release mechanism of claim 25 in combination with an automatic dispensing system for repeatedly dispensing various sets of different types of products, the dispensing system comprising:
at least one segregating means for maintaining the product elements in groups, all the products in each particular group being of the same type;
one release mechanism associated with each group;
at least one conveying means for conveying the released elements away from a corresponding at least one segregating means, the conveying means moving sequentially past each of the release mechanisms;
control means for controlling the order in which the release mechanisms are actuated to release the individual elements of a desired set of elements, the control means causing the elements to be released in an order ascending through the sequential path of the conveying means.

28. A dispensing system as in claim 27, wherein the conveying means can operate at a plurality of speeds, the control means operates to prevent the first element in the next set of elements from being released until after the last element from the previous set has passed the last release means in the sequence, and the control means further operates to increase the speed of the conveying means until the next set of elements is released.

29. A conveying system as in claim 27, wherein release detecting means are provided to detect the successful release of each element by the release means.

30. A conveying system as in claim 27, wherein merging means are provided sequentially after the release means for merging the elements on each conveying means to an output, the merging means operating to allow the elements of the conveying means whose lead element first reaches the merge means to continue to the output first, while holding back the elements on all the other conveying means.

* * * * *